United States Patent
Wang et al.

(10) Patent No.: US 9,279,823 B2
(45) Date of Patent: Mar. 8, 2016

(54) OPTICAL ACCELEROMETER

(71) Applicant: PixArt Imaging Inc, Hsin-chu County (TW)

(72) Inventors: Wei-Chung Wang, Hsin-chu (TW); Hui-Hsuan Chen, Hsin-chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 144 days.

(21) Appl. No.: 13/941,862

(22) Filed: Jul. 15, 2013

(65) Prior Publication Data

US 2014/0076050 A1    Mar. 20, 2014

(30) Foreign Application Priority Data

Sep. 20, 2012 (TW) .............. 101134619 A (51) Int. Cl.
*G01B 9/02* (2006.01)
*G01P 15/093* (2006.01)
*G01P 15/18* (2013.01)

(52) U.S. Cl.
CPC ............... *G01P 15/093* (2013.01); *G01P 15/18* (2013.01)

(58) Field of Classification Search
CPC ............ G01B 9/26; H01S 3/08; G01P 15/93; G01P 21/00
See application file for complete search history.

(56) References Cited

U.S. PATENT DOCUMENTS

| 6,473,187 | B1* | 10/2002 | Manalis .................. 356/521 |
| 8,205,497 | B1* | 6/2012 | Okandan et al. ........... 73/514.26 |
| 2004/0060355 | A1* | 4/2004 | Nemirovsky et al. ...... 73/504.14 |
| 2006/0227845 | A1* | 10/2006 | Degertekin et al. ........ 372/102 |
| 2014/0130570 | A1* | 5/2014 | Lal et al. ................. 73/1.41 |

FOREIGN PATENT DOCUMENTS

| CN | 101793909 A | 8/2010 |
| TW | 201135233 A | 10/2011 |

* cited by examiner

*Primary Examiner* — Tarifur Chowdhury
*Assistant Examiner* — Jamil Ahmed
(74) *Attorney, Agent, or Firm* — Hauptman Ham, LLP (57) ABSTRACT

There is provided an optical accelerometer including a first substrate, a second substrate, a spacer and a processing unit. The first substrate includes a frame, a movable member and at least one elastic member. Periodic slots are formed on the movable member along at least one direction to be served as a diffraction grating. The elastic member is connected between the frame and the movable member. The second substrate includes at least one sensing unit configured to detect a diffraction pattern formed by the diffraction grating. The spacer is disposed between the first substrate and the second substrate to define a predetermined height. The processing unit is coupled to the sensing unit and configured to calculate a 3D acceleration according to the diffraction pattern.

21 Claims, 5 Drawing Sheets

OPTICAL ACCELEROMETER

CROSS REFERENCE TO RELATED APPLICATION

This application claims the priority benefit of Taiwan Patent Application Serial Number 101134619, filed on Sep. 20, 2012, the full disclosure of which is incorporated herein by reference.

BACKGROUND

1. Field of the Disclosure

This disclosure generally relates to an acceleration detection device and, more particularly, to an optical accelerometer for detecting the 3D acceleration.

2. Description of the Related Art

The accelerometer generally employs a spring connecting to a proof mass and calculates the amplitude and direction of an acceleration by detecting a position variation of the proof mass caused by the acceleration. The conventional accelerometers generally include the capacitive accelerometer and the optical accelerometer.

The conventional capacitive accelerometer includes a plurality of comb-like first electrode plates on a proof mass and a plurality of comb-like second electrode plates on a substrate, wherein each of the second electrode plates is inserted between two of the first electrode plates. Meanwhile, the proof mass is connected to the substrate through a spring. When an acceleration occurs, the capacitance between the first electrode plates and the second electrode plates changes and thus it is able to calculate the acceleration by monitoring a capacitance variation. However, problems of the capacitive accelerometer are that the capacitance variation is very small and difficult to be measured, and it is difficult to measure the acceleration more than two dimensions.

The conventional optical accelerometer includes a transmitting fiber on a proof mass and a detecting fiber on a substrate. The light emitted from a light source is optically coupled to the detecting fiber from the transmitting fiber. Meanwhile, the proof mass is connected to the substrate through a spring. When the vibration occurs, the light coupling between the transmitting fiber and the detecting fiber is changed and thus it is able to calculate the acceleration by monitoring a light coupling efficiency. However, the alignment between the transmitting fiber and the detecting fiber is not easy to implement.

Accordingly, the present disclosure further provides an optical accelerometer capable of detecting the 3D acceleration simultaneously.

SUMMARY

The present disclosure provides an optical accelerometer capable of detecting the three-dimensional acceleration according to a diffraction pattern.

The present disclosure provides an optical accelerometer including a first substrate, a second substrate, a spacer and a processing unit. The first substrate includes a frame, a movable member and at least one elastic member. Periodic slots are formed along at least one direction on the movable member to be served as a diffraction grating. The at least one elastic member is connected between the frame and the movable member to allow the movable member to be able to perform relative motion with respect to the frame. The second substrate includes at least one sensing unit configured to detect a zero-order diffraction pattern and a first-order diffraction pattern generated by the diffraction grating. The spacer is disposed between the first substrate and the second substrate and configured to define a predetermined height. The processing unit is coupled to the sensing unit and configured to calculate a three-dimensional acceleration according to the zero-order diffraction pattern and the first-order diffraction pattern.

The present disclosure further provides an optical accelerometer including a sensing substrate, a grating substrate, a coherent light source and a processing unit. The sensing substrate includes at least one sensing unit. The grating substrate is opposite to the sensing substrate and includes a movable member, wherein at least one diffraction grating is formed on the movable member and the movable member may perform relative motion with respect to the sensing substrate in accelerating. The coherent light source is configured to illuminate the at least one diffraction grating to generate a diffraction pattern on the at least one sensing unit. The processing unit is coupled to the at least one sensing unit and configured to calculate a three-dimensional acceleration according to the diffraction pattern.

In one aspect, the processing unit may calculate an in-plane acceleration according to a position variation of the zero-order diffraction pattern and calculate an out-of-plane acceleration according to a relative relation between the zero-order diffraction pattern and the first-order diffraction pattern.

In one aspect, the diffraction grating may be a transmissive diffraction grating or a reflective diffraction grating.

In one aspect, the optical accelerometer further includes a coherent light source configured to emit coherent light to illuminate the diffraction grating so as to generate the zero-order diffraction pattern and the first-order diffraction pattern.

In one aspect, the diffraction grating may be formed by periodic slots or parallel fingers. When the diffraction grating is illuminated by coherent light, the diffraction pattern may be generated at the same side or the opposite side of the coherent light.

In one aspect, the diffraction grating may include a first diffraction grating formed along a first direction and a second diffraction grating formed along a second direction. The second substrate may include a first sensing unit corresponding to the first diffraction grating and a second sensing unit corresponding to the second diffraction grating. The processing unit is configured to calculate a first in-plane acceleration according to the diffraction pattern detected by the first sensing unit and to calculate a second in-plane acceleration according to the diffraction pattern detected by the second sensing unit.

In the optical accelerometer according to the embodiment of the present disclosure, the wavelength of coherent light, grating pitch, shape of periodic slots and distance between the grating and the sensing unit do not have particular limitation as long as at least the zero-order diffraction pattern and the first-order diffraction pattern may be generated on the sensing unit to allow the processing unit be able to accordingly calculate the three-dimensional acceleration.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
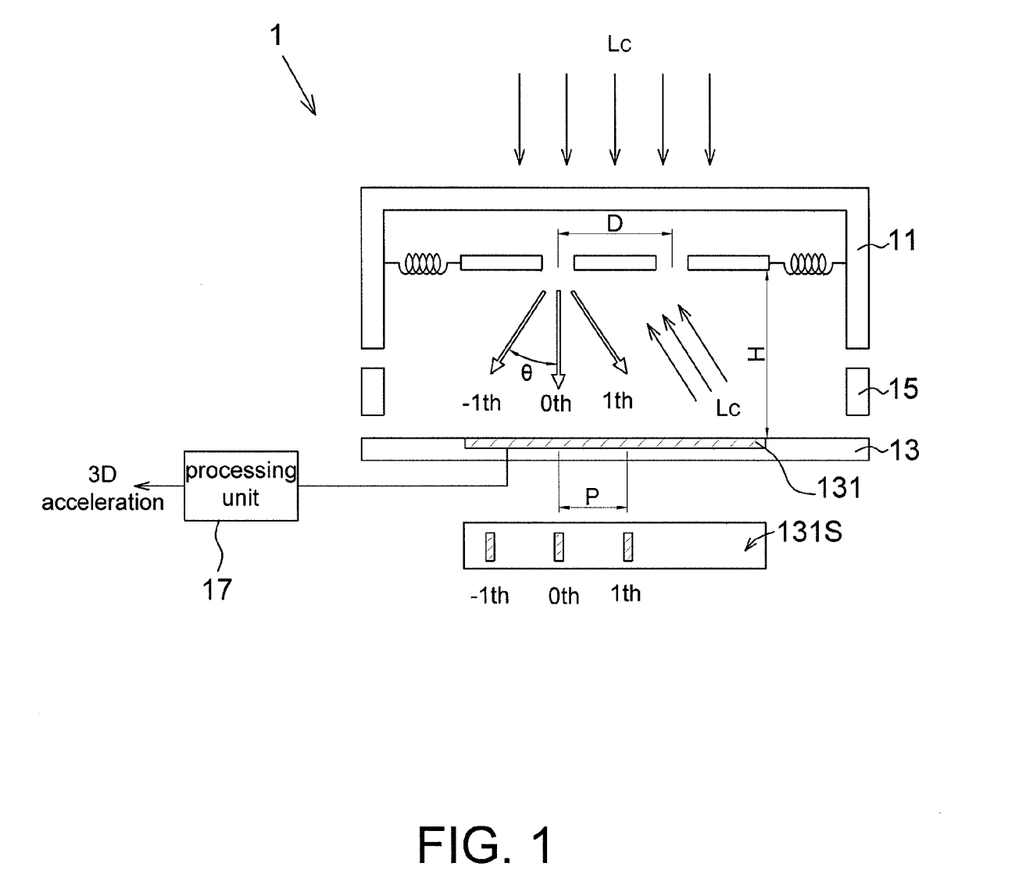
FIG. 1 shows a cross sectional view of the optical accelerometer according to an embodiment of the present disclosure.

Referring to FIG. 1, it shows a cross sectional view of the optical accelerometer 1 according to an embodiment of the present disclosure, which includes a first substrate 11, a second substrate 13, a spacer 15 and a processing unit 17, wherein the spacer 15 is configured to be disposed between the first substrate 11 and the second substrate 13 for defining a predetermined height H. The spacer 15 may be made of any suitable material without particular limitation as long as it is able to keep a predetermined distance (i.e. the predetermined height H) between the first substrate 11 and the second substrate 13, and the predetermined distance may be determined by the image resolution of an image sensor included in the optical accelerometer 1; e.g. if the resolution of the image sensor is higher, the predetermined distance may be shortened. In this embodiment, the first substrate 11 is served as a grating substrate whereas the second substrate 13 is served as a sensing substrate.

Figure 2:
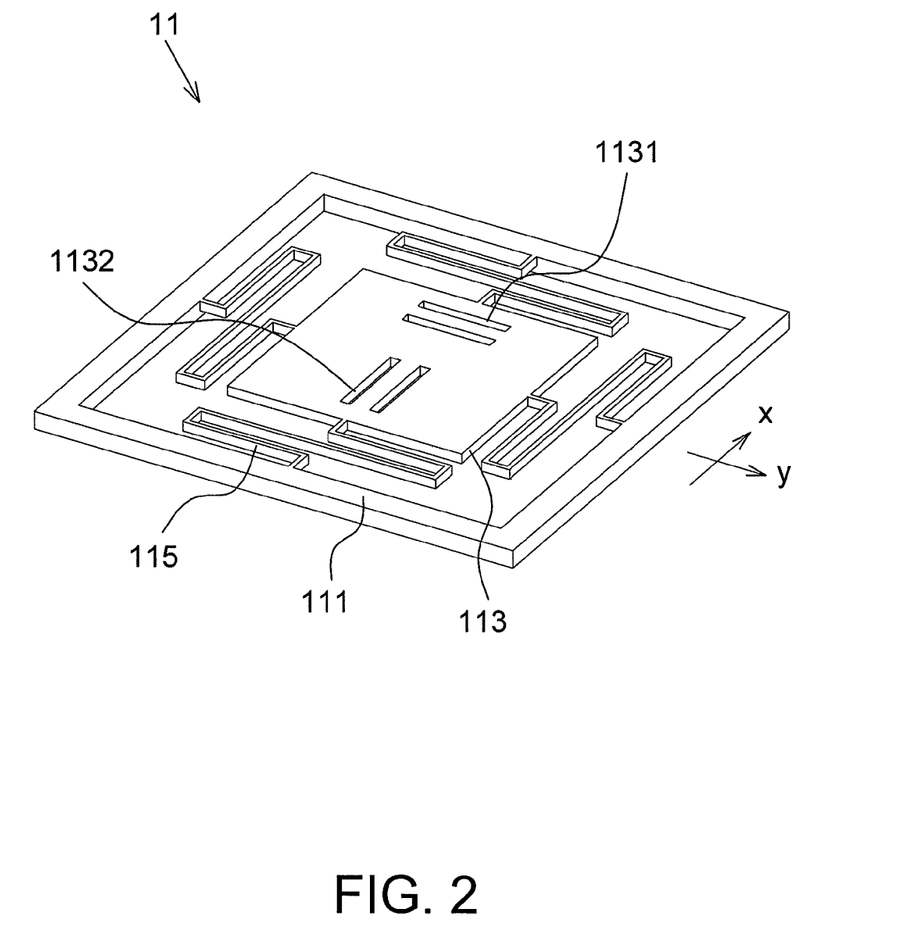
FIG. 2 shows a schematic diagram of the first substrate of the optical accelerometer according to the embodiment of the present disclosure.

Referring to FIGS. 1 and 2, FIG. 2 shows a schematic diagram of the first substrate 11 of the optical accelerometer 1 according to the embodiment of the present disclosure. The first substrate 11 includes a frame 111, a movable member 113 and at least one elastic member 115. It is appreciated that the scale relation between every component shown in FIG. 2 is only intended to illustrate but not to limit the present disclosure.

The movable member 113 may be a proof mass on which periodic slots are formed along at least one direction to be served as a diffraction grating. For example in FIG. 2, first periodic slots 1131 are formed along a first direction x and second periodic slots 1132 are formed along a second direction y on the movable member 113, wherein the first direction x is substantially perpendicular to the second direction y. In other words, in this embodiment at least one diffraction grating is formed on the movable member 113, e.g. including a first diffraction grating along the first direction x and a second diffraction grating along the second direction y. In this embodiment, the diffraction grating is formed by periodic slots (e.g. slots 1131, 1132). It is appreciated that as the periodic slots are served as the diffraction grating, the slots penetrate through two sides of the movable member 113. If the optical accelerometer 1 is only used to detect the one-dimensional acceleration, the diffraction grating may be formed only along one direction (e.g. direction x or y).

The at least one elastic member 115 is connected between the frame 111 and the movable member 113 to allow the movable member 113 to be able to perform relative motion with respect to the frame I 1 1. In this manner, when the first substrate 11 is combined with the second substrate 13 through the spacer 15, the movable member 113 may perform relative motion with respect to the second substrate 13 in accelerating.

In one embodiment, the first substrate 11 may be a silicon substrate, and the frame 111, the elastic member 115, the movable member 113 and the at least one diffraction grating (e.g. 1131, 1132) thereon may be respectively formed by photolithography process. In other embodiments, the first substrate 11 may also be manufactured by MEMS process or micro electroplating process without particular limitation. The material of the first substrate 11 may be determined according to the process for forming the frame 111, the elastic member 115, the movable member 113 and the diffraction grating.

The second substrate 13 includes at least one sensing unit 131 configured to detect a diffraction pattern formed by the diffraction grating (e.g. 1131, 1132), wherein a diffraction grating may generate a zero-order, first-order, second-order and high-order diffraction patterns. In this embodiment, the processing unit 17 is coupled to the at least one sensing unit 131 (e.g. via pads or bumps forming on the second substrate 13) and configured to calculate a three-dimensional acceleration according to the zero-order diffraction pattern 0th and the first-order diffraction pattern ±1th (described later). The sensing unit 131 may be an optoelectronic diode that may be directly formed on the second substrate 13 using the conventional method; for example the ion implantation, but not limited to. The sensing unit 131 may also be a CCD image sensor, a CMOS image sensor or other optoelectronic devices that are disposed or directly formed on the second substrate 13 using other methods. The method of manufacturing the sensing unit 131 is well known and thus details thereof are not described herein. The processing unit 17 may be a digital signal processor (DSP) configured to post-process the image data outputted by the sensing unit 131.

In addition, when two sets or more than two sets of diffraction gratings (e.g. 1131 and 1132 shown in FIG. 2) are formed on the movable member 113, the second substrate 13 may include corresponding numbers of the sensing units that are physically separated from each other and electrically coupled to the processing unit 17. For example, if a first diffraction grating 1131 and a second diffraction grating 1132 are formed on the first substrate 11, the second substrate 13 may include a first sensing unit corresponding to the first diffraction grating 1131 and a second sensing unit corresponding to the second diffraction grating 1132. The processing unit 17 may calculate a first in-plane acceleration according to the diffraction pattern (e.g. the zero-order diffraction pattern 0th) detected by the first sensing unit and calculate a second in-plane acceleration according to the diffraction pattern (e.g. the zero-order diffraction pattern 0th) detected by the second sensing unit, but the present disclosure is not limited thereto. The second substrate 11 may only include a single sensing unit 131, which for example has a larger area, configured to simultaneously detect diffraction patterns generated by the first diffraction grating (e.g. 1131) and the second diffraction grating (e.g. 1132). The number of the diffraction gratings may be determined according to different applications.

In this embodiment, in order to generate the diffraction pattern on the sensing unit 131, a coherent light source Lc is further included configured to emit coherent light to illuminate the at least one diffraction grating so as to generate a diffraction pattern, including the zero-order diffraction pattern 0th and the first-order diffraction pattern +1th (as shown in FIG. 1), on a sensing surface 131S of the at least one sensing unit 131. In addition, the disposed position of the coherent light source Lc may be different according to the type of the diffraction grating. For example, when the diffraction grating is a transmissive diffraction grating, the coherent light source Lc and the sensing unit 131 are disposed at opposite sides of the first substrate 11; but when the diffraction grating is a reflective diffraction grating, the coherent light source Lc and the sensing unit 131 are disposed at the same side of the first substrate 11.

Next, the calculation of the three-dimensional acceleration of the optical accelerometer 1 in this embodiment is illustrated. In the present disclosure, the three-dimensional acceleration may include an in-plane acceleration and an out-of-plane acceleration, wherein the in-plane acceleration may include two dimensions (e.g. the transverse movement) whereas the out-of-plane acceleration may include one dimension (e.g. the longitudinal movement).

Figure 3A:
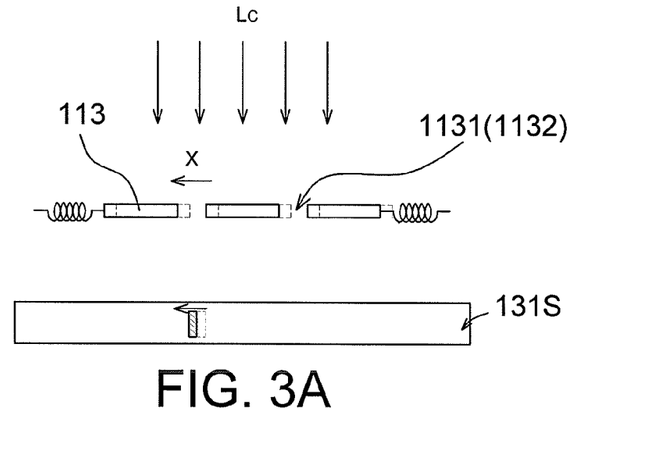
FIGS. 3A-3C show operational schematic diagrams of detecting three-dimensional acceleration by the optical accelerometer according to the embodiment of the present disclosure.
Figure 3B:
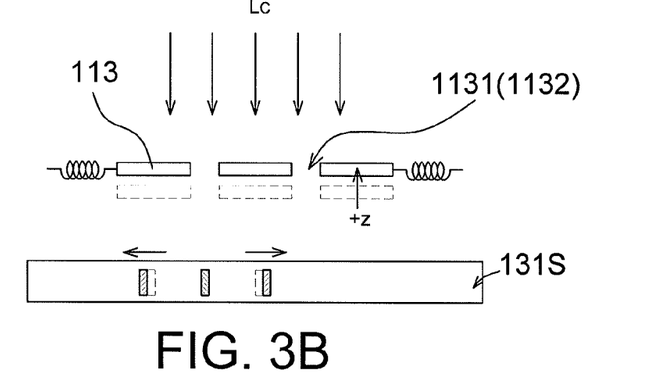
Figure 3C:
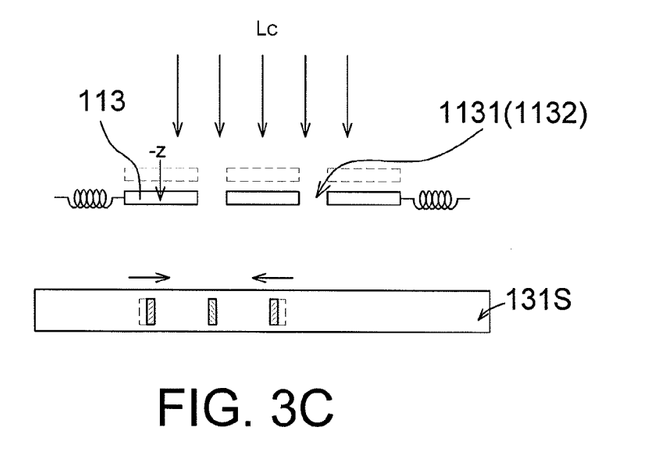

Referring to FIGS. 3A-3C, they respectively show a schematic diagram of calculating the three-dimensional acceleration by the optical accelerometer 1 according to the embodiment of the present disclosure, wherein only the diffraction grating 1131 (or 1132) and the diffraction pattern are shown herein and a part of components in FIG. 1 are omitted for simplification purpose. Meanwhile, the descriptions are made by using the transmissive diffraction grating as an example. As the operation of the reflective diffraction grating is similar to that of the transmissive diffraction grating, details of the reflective diffraction grating are not described herein.

For example in FIG. 3A, the coherent light Lc generates a zero-order diffraction pattern 0th (not showing the higher-order diffraction pattern herein for simplification) on the sensing surface 131S of the sensing unit 131 through the diffraction grating 1131 (1132), wherein the zero-order diffraction pattern 0th corresponds to the slots of the diffraction grating 1131. When the movable member 113 has an in-plane movement (e.g. toward the x direction), it means that the optical accelerometer 1 has an acceleration in a reverse direction (e.g. toward −x direction), and the position of the zero-order diffraction pattern 0th relatively changes. Accordingly, the processing unit 17 may calculate an in-plane acceleration according to a position variation of the zero-order diffraction pattern 0th. It is appreciated that the acceleration perpendicular to the x direction (e.g. the y direction) may be calculated by using the same method according to the zero-order diffraction pattern 0th generated by another set of diffraction grating. That is, the two-dimensional in-plane acceleration may be calculated according to two sets of diffraction gratings (e.g. 1131 and 1132).

In FIG. 1, it is assumed that the grating pitch is D, the predetermined height (i.e. the distance between the grating and the sensing unit 131) is H and the wavelength of coherent light source Lc is λ. The relative relation P between the zero-order diffraction pattern 0th and the first-order diffraction pattern ±1th may be obtained by:

$$D \times \sin \theta = m\lambda \quad (1)$$

$$P = H \times \tan \theta \quad (2),$$

wherein m indicates the diffraction order. In this manner, when the movable member 113 has an out-of-plane movement (e.g. along z direction), the predetermined height H changes and thus the position of the first-order diffraction pattern ±1th also changes.

For example in FIG. 3B, the coherent light source Lc generates a zero-order diffraction pattern 0th and a first-order diffraction pattern ±1th on the sensing surface 131S of the sensing unit 131 through the diffraction grating 1131 (1132). When the movable member 113 has an out-of-plane movement (e.g. along +z direction), it means that the optical accelerometer 1 has an acceleration in a reverse direction (e.g. along −z direction); now, the increase of the predetermined height H causes the first-order diffraction pattern ±1th moving away from the zero-order diffraction pattern 0th. For example in FIG. 3C, when the movable member 113 has an out-of-plane movement (e.g. along −z direction), it means that the optical accelerometer 1 has an acceleration in a reverse direction (e.g. along +z direction); now, the decrease of the predetermined height H causes the first-order diffraction pattern ±1th moving close to the zero-order diffraction pattern 0th. Accordingly, the processing unit 17 may calculate an out-of-plane acceleration according to a relative relation between the zero-order diffraction pattern 0th and the first-order diffraction pattern ±1th. Of course, the processing unit 17 may also calculate the out-of-plane acceleration only according to the position variation of or the relative relation between the first-order diffraction pattern ±1th itself. In the present disclosure, the term "in-plane" is referred to a plane at which the diffraction grating locates whereas the term "out-of-plane" is referred to a plane perpendicular to the in-plane.

Figure 4A:
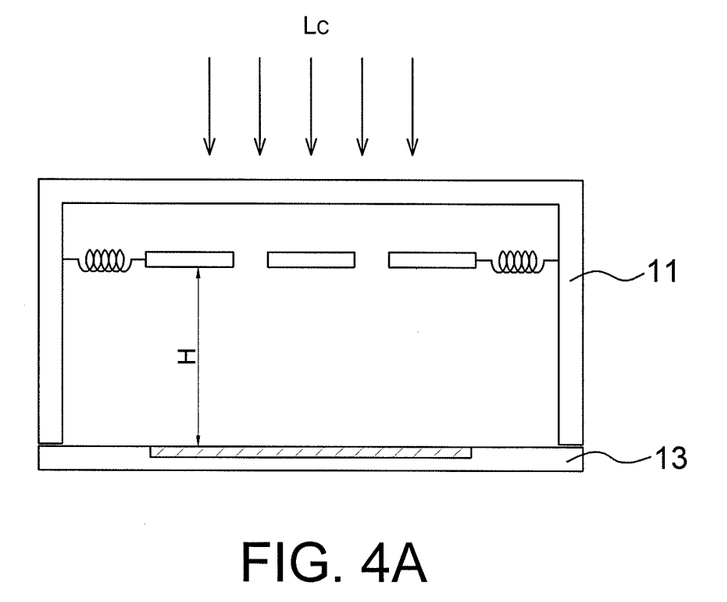
FIGS. 4A-4B respectively show a cross sectional view of the optical accelerometer according to another embodiment of the present disclosure.
Figure 4B:
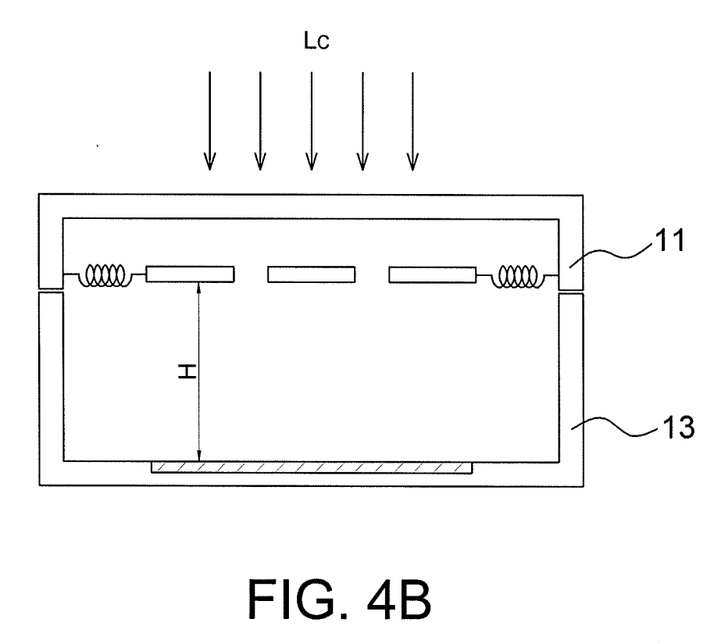

In another embodiment, the spacer 15 of the optical accelerometer 1 may be integrated with the first substrate 11. In this case the first substrate 11 includes a side wall at a periphery of the first substrate 11 and perpendicularly extending a predetermined height H toward the second substrate 13 as shown in FIG. 4A, and the first substrate 11 is combined with the second substrate 13 through the side wall. In another embodiment, the spacer 15 of the optical accelerometer 1 may be integrated with the second substrate 13. In this case the second substrate 13 includes a side wall at a periphery of the second substrate 13 and perpendicularly extending a predetermined height H toward the first substrate 11 as shown in FIG. 4B, and the second substrate 13 is combined with the first substrate 11 through the side wall. In other words, the optical accelerometer 1 of this disclosure may be formed by two substrates or by two substrates and one spacer.

It should be mentioned that in the embodiment of the present disclosure, positions of the zero-order diffraction pattern 0th and the first-order diffraction pattern ±1th may be defined as the position in the diffraction pattern having the highest brightness.

Figure 5:
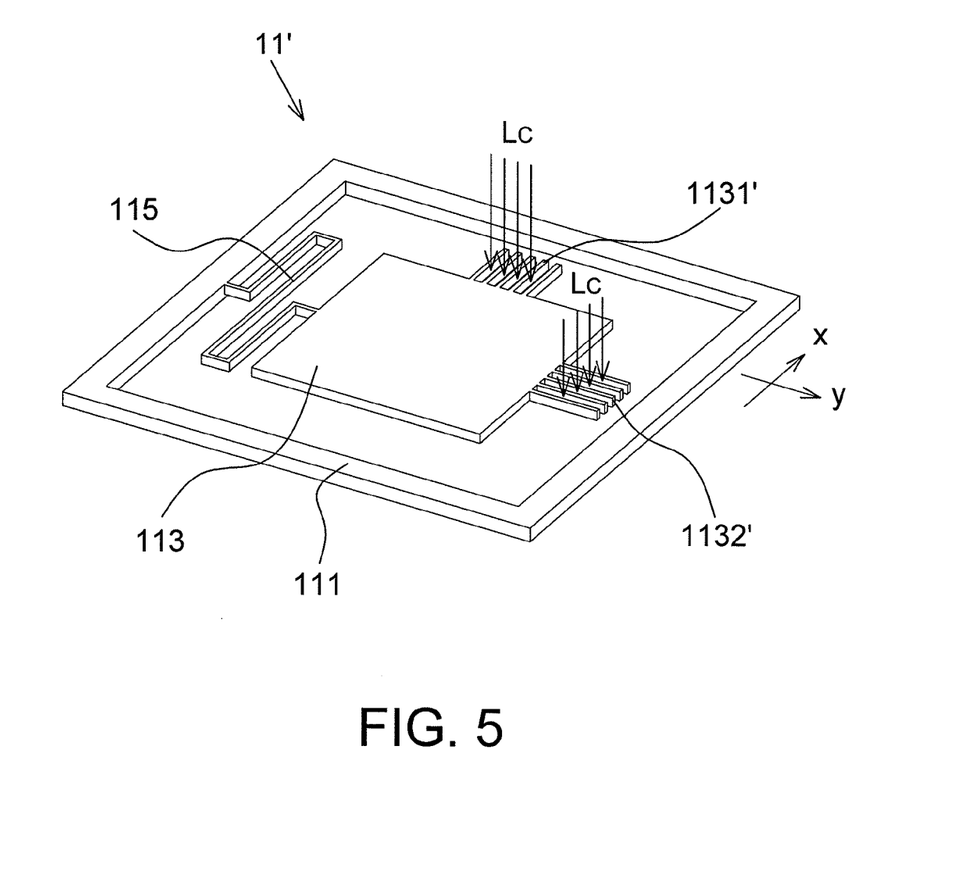
FIG. 5 shows a schematic diagram of the first substrate of the optical accelerometer according to another embodiment of the present disclosure.

In another embodiment, the diffraction grating may be formed as parallel fingers perpendicularly extending out from the movable member 113. For example as shown in FIG. 5, the movable member 113 includes first parallel fingers 1131' extending out along a first direction x and second parallel fingers 1132' extending out along a second direction y, wherein the first direction x is preferably perpendicular to the second direction y. The movable member 113 may also be connected to the frame 111 through at least one elastic member 115 to allow the movable member 113 to be able to perform relative motion with respect to the frame 111 when it is accelerated. The first substrate 11 may also be manufactured by photolithography, micro electroplating or MEMS process.

It should be mentioned that numbers, positions and shapes of the elastic member 115 shown in FIGS. 2 and 5 are only intended to illustrate but not to limit the present disclosure. For example, the elastic member 115 may also be formed at the corner of the movable member 113 without particular limitation as long as the movable member 113 is able to perform relative motion with respect to the frame 111 in accelerating.

In the embodiment of the present disclosure, the position of the coherent light source Lc may be determined according to the type and configuration of the diffraction grating without particular limitation. In addition, the wavelength λ of the coherent light source Lc does not have particular limitation as long as it is matched to the system parameters, e.g. the size and distance, of the optical accelerometer 1 so as to generate the diffraction pattern on the at least one sensing unit 131. The shape and number of the diffraction grating do not have particular limitation as long as it is able to generate at least the zero-order diffraction pattern and the first-order diffraction pattern on the at least one sensing unit 131 to allow the processing unit 17 to be able to calculate the three-dimensional acceleration according to the zero-order diffraction pattern and the first-order diffraction pattern, wherein the shape of the diffraction pattern is determined by the shape of the diffraction grating (or slots).

As mentioned above, as the conventional capacitive accelerometer has the problem of difficult to detect the acceleration more than two-dimensions and the conventional optical accelerometer needs to perform the light coupling between two fibers. Therefore, the present disclosure further provides an optical accelerometer (FIG. 1) that may detect the in-plane acceleration according to a zero-order diffraction pattern and detect the out-of-plane acceleration according to a first-order diffraction pattern so as to detect the three-dimensional acceleration at the same time.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical accelerometer, comprising:
    a first substrate, comprising:
        a frame;
        a movable member, periodic slots being formed along at least one direction on the movable member to be served as a diffraction grating; and
        at least one elastic member connected between the frame and the movable member;
    a second substrate disposed at one side of the first substrate and comprising at least one sensing unit configured to detect a zero-order diffraction pattern and a first-order diffraction pattern generated by interference between coherent light coming from another side of the first substrate and passing through the diffraction grating;
    a spacer disposed between the first substrate and the second substrate and configured to define a predetermined height; and
    a processing unit coupled to the sensing unit and configured to calculate a three-dimensional acceleration according to the zero-order diffraction pattern and the first-order diffraction pattern.

2. The optical accelerometer as claimed in claim 1, wherein the spacer is integrated with the first substrate or the second substrate.

3. The optical accelerometer as claimed in claim 1, wherein the processing unit is configured to calculate an in-plane acceleration according to a position variation of the zero-order diffraction pattern.

4. The optical accelerometer as claimed in claim 1, wherein the processing unit is configured to calculate an out-of-plane acceleration according to a relative relation between the zero-order diffraction pattern and the first-order diffraction pattern.

5. The optical accelerometer as claimed in claim 1, wherein the periodic slots comprise:
    first periodic slots formed along a first direction on the movable member, and
    second periodic slots formed along a second direction on the movable member.

6. The optical accelerometer as claimed in claim 5, wherein the at least one sensing unit of the second substrate comprises:
    a first sensing unit corresponding to the first periodic slots, and
    a second sensing unit corresponding to the second periodic slots.

7. The optical accelerometer as claimed in claim 6, wherein the processing unit is configured to calculate a first in-plane acceleration according to the zero-order diffraction pattern detected by the first sensing unit and to calculate a second in-plane acceleration according to the zero-order diffraction pattern detected by the second sensing unit.

8. The optical accelerometer as claimed in claim 1, wherein the diffraction grating is a transmissive diffraction grating.

9. The optical accelerometer as claimed in claim 8, further comprising a coherent light source configured to illuminate the diffraction grating by the coherent light so as to generate the zero-order diffraction pattern and the first-order diffraction pattern.

10. An optical accelerometer, comprising:
    a sensing substrate comprising at least one sensing unit;
    a grating substrate opposite to the sensing substrate and comprising a movable member, at least one diffraction grating being formed on the movable member, and the movable member configured to move relative to the sensing substrate in accelerating;
    a coherent light source, the coherent light source and the sensing substrate located at two opposite sides of the grating substrate, and the coherent light source configured to illuminate coherent light passing through the at least one diffraction grating to generate a diffraction pattern on the at least one sensing unit; and
    a processing unit coupled to the at least one sensing unit and configured to calculate a three-dimensional acceleration according to the diffraction pattern generated by interference of the coherent light coming from the coherent light source and passing through the at least one diffraction grating.

11. The optical accelerometer as claimed in claim 10, wherein the diffraction pattern comprises a zero-order diffraction pattern and a first-order diffraction pattern.

12. The optical accelerometer as claimed in claim 11, wherein the processing unit is configured to calculate an out-of-plane acceleration according to a relative relation between the zero-order diffraction pattern and the first-order diffraction pattern.

13. The optical accelerometer as claimed in claim 11, wherein the processing unit is configured to calculate an in-plane acceleration according to a position variation of the zero-order diffraction pattern.

14. The optical accelerometer as claimed in claim 10, wherein the at least one diffraction grating is a transmissive diffraction grating.

15. The optical accelerometer as claimed in claim 10, wherein the at least one diffraction grating is formed by periodic slots or parallel fingers.

16. The optical accelerometer as claimed in claim 15, wherein the at least one diffraction grating comprises a first diffraction grating along a first direction and a second diffraction grating along a second direction.

17. The optical accelerometer as claimed in claim 16, wherein the at least one sensing unit of the sensing substrate comprises:
    a first sensing unit corresponding to the first diffraction grating, and a second sensing unit corresponding to the second diffraction grating.

18. The optical accelerometer as claimed in claim 17, wherein the processing unit is configured to calculate a first in-plane acceleration according to the diffraction pattern detected by the first sensing unit and to calculate a second in-plane acceleration according to the diffraction pattern detected by the second sensing unit.

19. The optical accelerometer as claimed in claim 10, wherein the sensing substrate comprises a side wall at a periphery of the sensing substrate and perpendicularly extending a predetermined height toward the grating substrate.

20. The optical accelerometer as claimed in claim 10, wherein the grating substrate comprises a side wall at a periphery of the grating substrate and perpendicularly extending a predetermined height toward the sensing substrate.

21. An optical accelerometer, comprising:
a first substrate, comprising:
   a frame;
   a movable member, wherein
      periodic slots are formed along at least one direction on the movable member and configured as a diffraction grating,
      the diffraction grating is formed within a region on the movable member, and
      the region has the periodic slots and a bar between adjacent slots among the periodic slots; and
   at least one elastic member connected between the frame and the movable member;
a second substrate disposed at one side of the first substrate and comprising at least one sensing unit configured to detect a zero-order diffraction pattern and a first-order diffraction pattern generated by interference between coherent light coming from another side of the first substrate and passing through the diffraction grating, wherein the sensing unit has a continuous sensing area overlapping the periodic slots and the bar within the whole region of the diffraction grating on the movable member;
a spacer disposed between the first substrate and the second substrate and configured to define a predetermined height; and
a processing unit coupled to the sensing unit and configured to calculate a three-dimensional acceleration according to the zero-order diffraction pattern and the first-order diffraction pattern.

* * * * *